US005597502A

United States Patent [19]

Watanabe et al.

[11] Patent Number: 5,597,502

[45] Date of Patent: Jan. 28, 1997

[54] SINGLE PHASE/THREE PHASE HEATER ELEMENT CIRCUIT FOR A CERAMIC FIBER HEATER

[75] Inventors: Toru Watanabe; Shigetoshi Nagano, both of Tokyo, Japan

[73] Assignee: Sakaguchi Dennetsu Kabushiki Kaisha, Tokyo, Japan

[21] Appl. No.: 353,708

[22] Filed: Dec. 12, 1994

[30] Foreign Application Priority Data

Dec. 20, 1993 [JP] Japan .................................. 5-344506

[51] Int. Cl.[6] .............................. H05B 3/02; H05B 3/34; A21B 1/22

[52] U.S. Cl. .......................... 219/528; 219/539; 219/483; 219/406

[58] Field of Search .................................... 219/528, 538, 219/539, 548, 483–487, 507–508, 445–446, 552, 406–410

[56] References Cited

U.S. PATENT DOCUMENTS

| | | | |
|---|---|---|---|
| 3,500,444 | 3/1970 | Hesse et al. | 219/544 |
| 3,636,309 | 1/1972 | Deaton et al. | 219/464 |
| 3,979,576 | 9/1976 | Janson | 219/489 |
| 4,217,483 | 8/1980 | Vogel et al. | 219/541 |
| 4,575,619 | 3/1986 | Poretzky | 219/544 |
| 5,438,914 | 8/1995 | Hohn et al. | 219/464 |

*Primary Examiner*—Geoffrey S. Evans
*Assistant Examiner*—Sam Paik
*Attorney, Agent, or Firm*—Nilles & Nilles, S.C.

[57] ABSTRACT

A single phase and three phase heater element circuit for a ceramic fiber heater wherein a plurality of blocks each of which is formed by a plurality of heater elements arranged side by side on a base of insulation material and connected to one another to form a series circuit, said series circuit being connected across an electric power source, and adjacent ends of the series circuits in adjacent blocks being connected to the same terminal of said electric power source. By connecting adjacent ends of adjacent blocks of ceramic fiber heater element circuits together, the ends of the series circuit connected to separate terminals of the power source are spaced sufficiently far apart from each other such that current flow through the insulation material between ends adjacent the blocks is minimized and preferably substantially prevented for preventing short circuiting and failure of the heater.

20 Claims, 4 Drawing Sheets

SINGLE PHASE/THREE PHASE HEATER ELEMENT CIRCUIT FOR A CERAMIC FIBER HEATER

BACKGROUND OF THE INVENTION

1. Field of the Invention

This invention relates to a single and three phase heater clement circuit for an electrical heating unit and more particularly to an improvement in the construction and arrangement of a heater element circuit for a ceramic fiber for preventing short circuiting of the heater.

2. Description of the Prior Art

U.S. Pat. No. 4,575,619 discloses a ceramic fiber heater having a plurality of serpentine heater elements arranged side by side. FIG. 3 is a plane view of a conventional ceramic fiber heater having a plurality of serpentine heater elements to be connected across a single-phase electric power source. In FIG. 3, reference numerals 1*a*, 1*b*, - - - designate serpentine heater elements, respectively.

In such a ceramic fiber heater, four heater elements 1*a*–1*d*, for example, are arranged side by side on a base made of an insulation material to form one block 3*a* of the heater elements. In said one block 3*a*, one end 4*a* of a first heater element 1*a* is connected to one of terminals of a single-phase electric power source of 200 V, for example, and the other end of said first heater element 1*a* is connected through a connecting line 2 with one end of a second heater element 1*b*, adjacent to said other end of said first heater element 1*a*. Similarly, the other end of the second heater element 1*b* is connected through a connecting line 2 with one end of a third heater element 1*c*, and the other end of the third heater element 1*c* is connected through a connecting line 2 with one end of a fourth heater element 1*d*, so that the first to fourth heater elements 1*a*–1*d* form a series circuit. Both terminals 4*a* of said series circuit is connected across the single-phase electric power source of 200 V.

A block 3*b* similar to said block 3*a* is arranged adjacent to said block 3*a* on said base.

FIG. 4 shows a plane view of a conventional ceramic fiber heater to be connected across a three-phase electric power source of 200 V, for example. In this ceramic fiber heater, as like as the embodiment shown in FIG. 3, four heater elements 1*a*–1*d*, for example, are arranged side by side on a base made of insulation material to form one block 3*a*. In said one block 3*a*, the four heater elements 1*a*–1*d* are connected in series. Blocks 3*b* and 3*c*, each similar to said block 3*a*, are arranged side by side on the base, and each series circuit of each block 1*a*–1*d* is applied with a phase voltage of the three-phase electric power source of 200 V.

As shown in FIG. 3, both ends 4*a* of the series circuit in the block 3*a* are connected across the single-phase electric power source of 200 V. With respect to the block 3*b*, similarly, both ends 4*b* of the series circuit are connected across the single-phase electric power source of 200 V.

Accordingly, a voltage difference of 200 V is formed between one end 4*a* of the series circuit in the block 3*a* and one end 4*b* of the series circuit in the block 3*b*, adjacent to said one end 4*a*. Normally, a distance between said ends 4*a* and 4*b* is short, such as several millimeters, and the insulation resistance or specific resistance of the ceramic fiber base made of alumina silica, etc. is reduced remarkably at a temperature higher than about 1,000° C., so that a leakage current flows through the insulation material between the two ends 4*a* and 4*b* and the leakage current becomes large due to the voltage applied between said two ends 4*a* and 4*b*, and the heater element is liable to be burned and damaged.

Specifically, in case of mullite (compound of alumina and silica), for example, at 900° C., the specific resistance is $2\times10^5(\Omega\cdot cm)$, at 1000° C., the specific resistance reduces to $5.5\times10^4\Omega cm$, at 1100° C., the specific resistance reduces to $1.2\times10^4\Omega cm$, and at 1200° C., the specific resistance reduces to $2.5\times10^3\Omega cm$.

A voltage of the power source is applied between said adjacent ends 4*a* and 4*b* of the series circuits, so that a leakage current flows through the electrical insulation material therebetween at a higher temperature and accordingly the temperature of said material portion is elevated.

As a result, the insulation resistance of said material portion is reduced, so that the leakage current is increased. Such phenomenon is repeated and accordingly the temperature of said material portion is elevated abnormally, so that the heater element is burned and damaged.

In case that the three-phase electric power source is used, as shown in FIG. 4, a voltage difference of about 200 V is formed between one end 5*a* of the series circuit in the block 3*a* and one end 5*b* of the series circuit in the block 3*b*, adjacent to said one end 5*a* or between the other end 5*b* of the series circuit in the block 3*b* and one end 5*c* of the series circuit in the block 3*c*, adjacent to said other end 5*b*, so that similar defects and problems often arise.

SUMMARY OF THE INVENTION

An object of the present invention is to obviate the above defects.

The above object can be attained by a ceramic fiber heater comprising a plurality of series circuits each of which is formed by connecting a plurality of heater elements arranged side by side on a base of an insulation material and connected across an electric power source, characterized in that adjacent two series circuits are arranged so that one end of one series circuit is adjacent to one end of the other series circuit, and that said adjacent ends of said adjacent series circuits are connected to the same terminal of the electric power source.

In the ceramic fiber heater according to the present invention, the same electric potential is applied to said adjacent ends of said adjacent series circuits.

A current control element, such as a relay, solid state relay or semiconductor (SSR), or thyristor can be inserted between said terminal of the electric power source and said adjacent one end of the adjacent one series circuit to control the series circuit.

DESCRIPTION OF THE PREFERRED EMBODIMENTS

Figure 1:
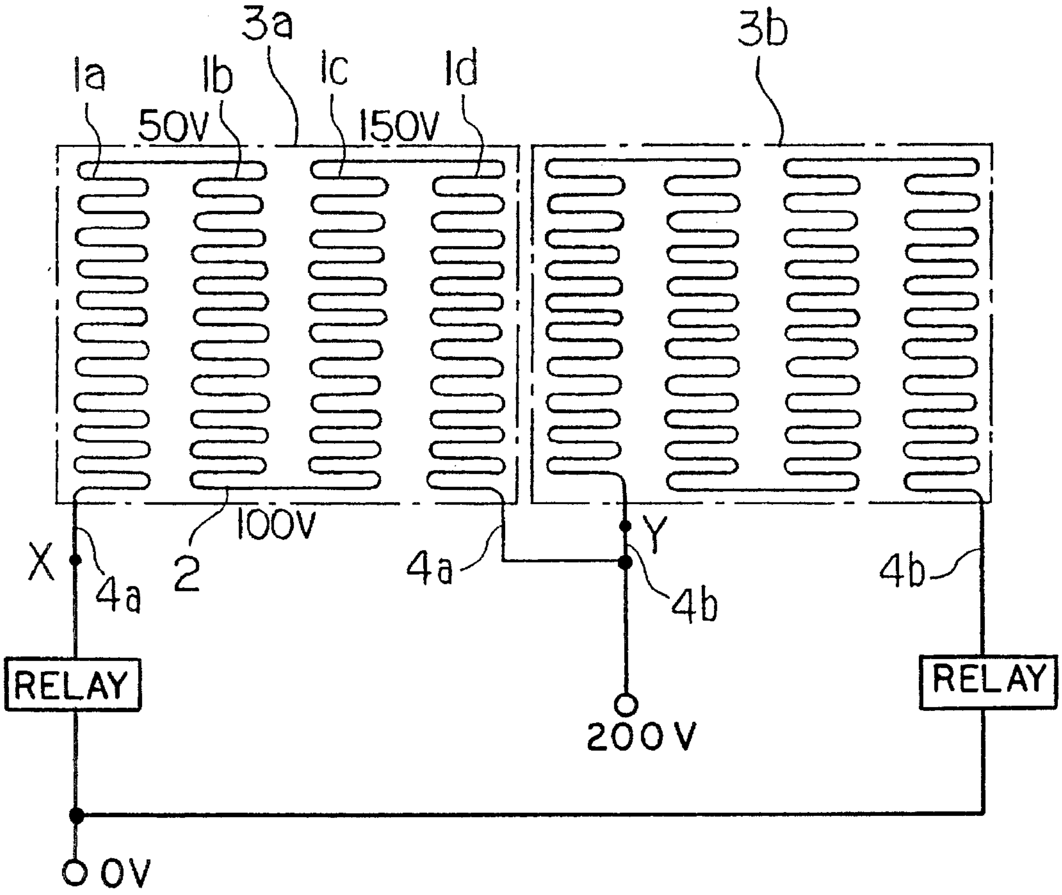
FIG. 1 is a view explaining a ceramic fiber heater to be connected across a single-phase electric power source according to the present invention.

Now, an embodiment of this invention in case that a single-phase electric power source is used will be described by referring to FIG. 1.

According to the present invention, one end 4a of a series circuit in a block 3a and one end 4b of a series circuit in a block 3b, adjacent to said one end 4a are connected to the same one terminal of the electric power source. The other end 4a of the series circuit in the block 3a and the other end of the series circuit in the block 3b are connected to the same other terminal of the electric power source.

Another embodiment of this invention in case that a three-phase electric power source is used will be explained with reference to FIG. 2.

In this embodiment, one end 5a of a series circuit in a block 3a and one end 5b of a series circuit in a block 3b, adjacent to said one end 5a are connected to the same one terminal of the three-phase electric power source.

Similarly, the other end 5b of the series circuit in the block 3b and one end 5c of a series circuit in a block 3c, adjacent to said other end 5b are connected to the same another terminal of the three-phase electric power source.

The other end 5a of the series circuit in the block 3a and the other end 5c of the series circuit of the block 3c are connected to the same other terminal of the three-phase electric power source.

As described above, the ends adjacent to each other of the series circuits in the blocks adjacent to each other have the same electric potential and therefore the voltage difference between the adjacent ends of the series circuits in the adjacent blocks becomes zero, so that the defects of the conventional ceramic fiber heater can be obviated.

Figure 2:
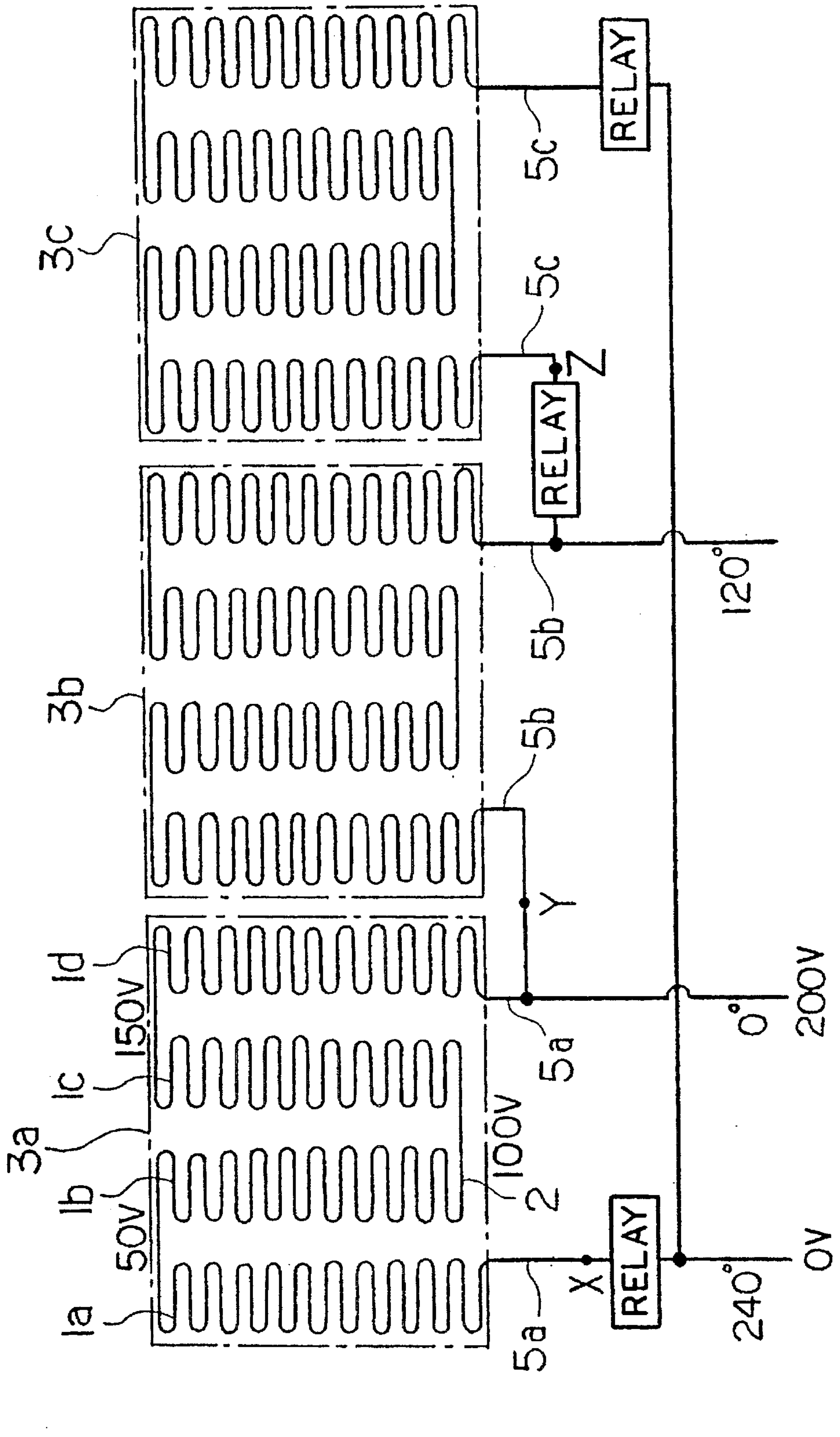
FIG. 2 is a view explaining a ceramic fiber heater to be connected across a three-phase electric power source according to the present invention.
Figure 3:
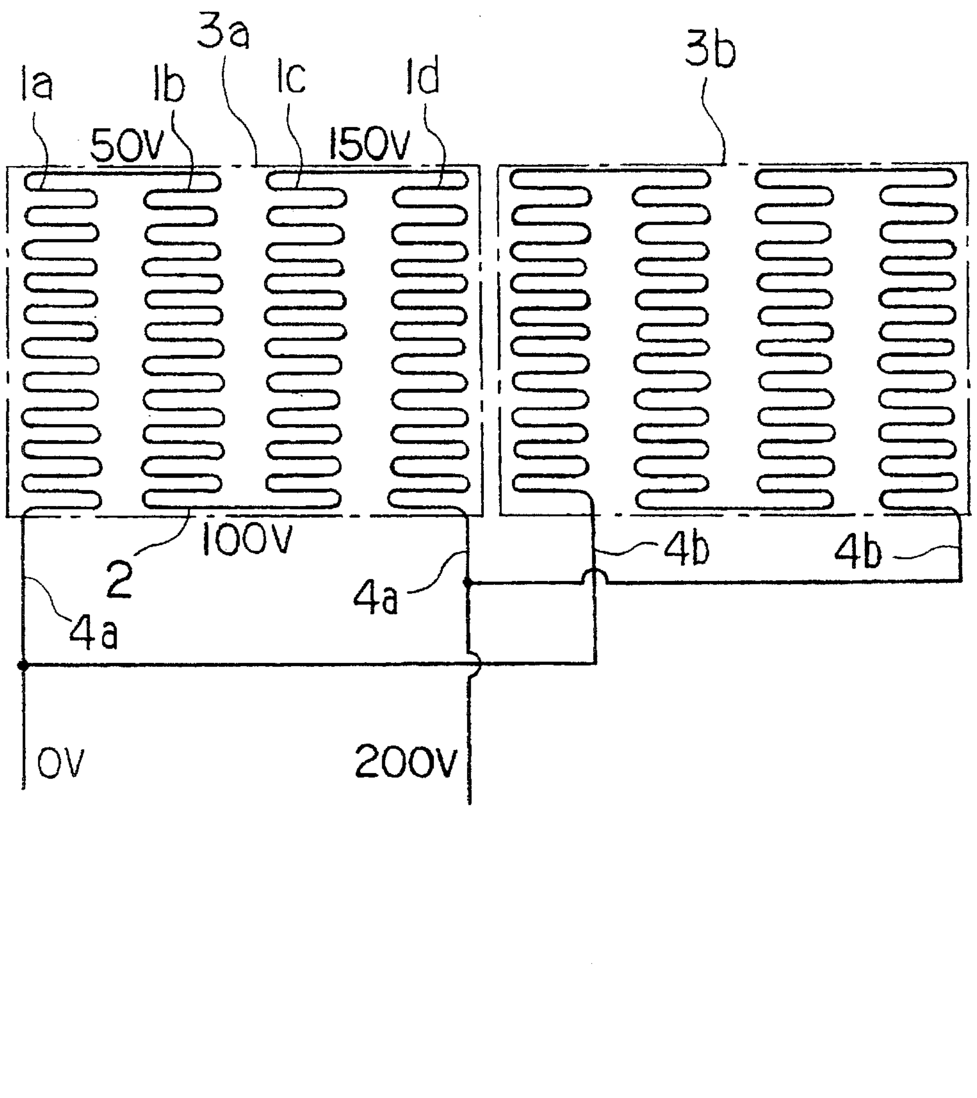
FIG. 3 PRIOR ART
FIG. 3 is a view explaining a conventional ceramic fiber heater to be connected across a single-phase electric power source.
Figure 4:
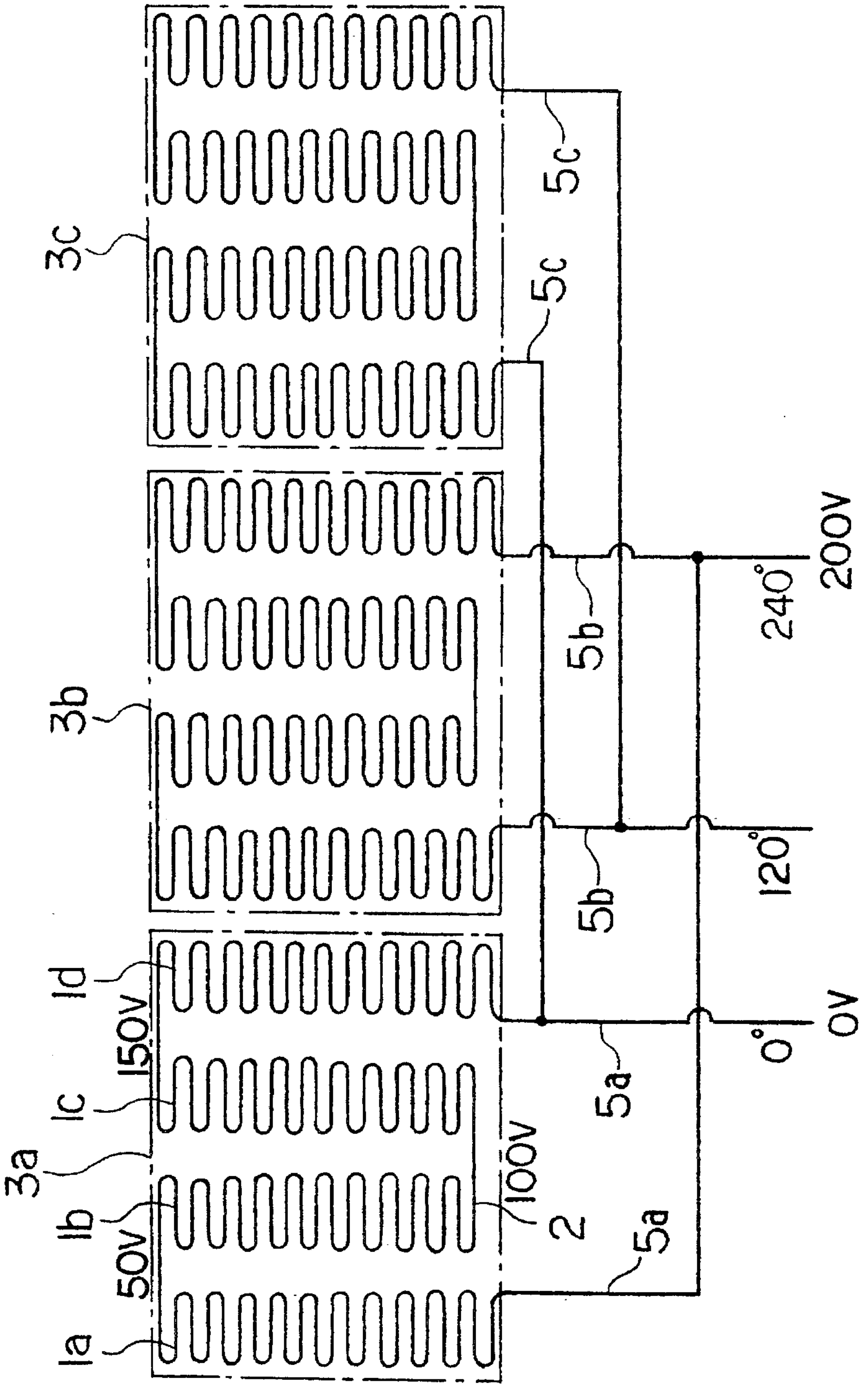
FIG. 4 PRIOR ART
FIG. 4 is a view explaining a conventional ceramic fiber heater to be connected across a three-phase electric power source.

It is appreciated that the maximum voltage difference between adjacent heater elements is low, such as 100 V in case of FIG. 1 or FIG. 2 and the maximum voltage difference can be reduced by increasing the number of the heater elements forming a series circuit.

Further, in the present invention, a helical heater element can be used instead of the serpentine heater element.

It is preferable to control each heater block by inserting a current control element, such as a relay, SSR, or thyristor between the adjacent one end of the series circuit and one terminal of the electric power source at the X or Y portions or branches shown in FIG. 1, or the X, Y, or Z portions or branches shown in FIG. 2.

In the present invention, as the heater element, nichrome, iron-chrome-aluminum alloy or the like in the shape of a wire, a strip or the like can be used.

EFFECT OF THE INVENTION

As stated above, in the present invention, no voltage difference is formed between the adjacent ends of the adjacent series circuits. Accordingly, the abnormal current is prevented from flowing between said adjacent ends of the adjacent series circuits, so that the service life of the ceramic fiber heater element can be prolonged.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A ceramic fiber heater comprising: a plurality of series circuits each of which is formed by connecting a plurality of heater elements arranged side by side on a base of an insulated material and connected across an electric power source, each of the series circuits having first and second ends electrically connected to different terminals of the electric power source, the second end of a first of the circuits being located between the first end of the first of the circuits and the first end of a second of the circuits located adjacent the first of the circuits, the first end of the second of the circuits being arranged between the second end of the first of the circuits and the second end of the second of the circuits, wherein the circuits are arranged so that the second end of the first of the circuits is located adjacent the first end of the second of the circuits and so that the second end of the first of the circuits and the first end of the second of the circuits are connected to the same terminal of the electric power source thereby to minimize current leakage between the second end of the first of the circuits and the first end of the second of the circuits.

2. The ceramic fiber heater of claim 1 wherein a current control element is inserted between said terminal of the electric power source and the first end of said first of the circuits and the second end of said second of the circuits.

3. The ceramic fiber heater of claim 2 wherein said current control element is one of a relay, SSR and thyristor.

4. The ceramic fiber heater of claim 2 wherein said heater element is serpentine.

5. The ceramic fiber heater of claim 1 wherein said heater elements are serpentine.

6. The ceramic fiber heater of claim 1 wherein said insulation material is composed of a ceramic fiber.

7. The ceramic fiber heater of claim 6 wherein said ceramic fiber insulating material is mullite or an aluminum silica.

8. The ceramic fiber heater of claim 1 wherein the first end of the first of the circuits is not adjacent to the second end of the second of the circuits and is connected to the same terminal of the power source as the second end of the second of the circuits.

9. The ceramic fiber heater of claim 8 wherein said electric power source is a single phase power source having (1) a pair of terminals and (2) an electric potential between said terminals, and wherein the series circuits are connected to said single phase power source such that said second end of the first of the circuits and said first end of the second of said circuits are connected to one of said terminals of said power source and said first end of the first of said circuits and said second end of the second of said circuits are connected to the other of said terminals of said power source.

10. The ceramic fiber heater of claim 1, wherein the first and second ends of all of the circuits are located on a common side of the base.

11. The ceramic fiber heater of claim 1, wherein said electric power source is a three phase power source having three terminals.

12. A ceramic fiber heater comprising:

(a) a base constructed of a ceramic fiber insulation;

(b) first and second heater blocks arranged side by side with each other on said base, said first heater block comprising a first series circuit comprising a plurality of heater elements arranged side by side on said base and connected together in series such that said heater elements are carried substantially along said length of said first series circuit by said base, said first series circuit having first and second ends spaced apart from one another and located on a common side of said base, said second series circuit including a second series circuit comprising a plurality of heater elements arranged side by side on said base and connected together in series such that said heater elements are carried substantially along said length of said second series circuit by said base, said second series circuit having first and second ends spaced apart from one another and located on said common side of said base, said second end of said first series circuit being located between said first end of said first series circuits and said first end of said second series circuit, said first end of said second series circuit being located between said second end of said first series circuit and said second end of said second series circuit, said second end of said first series circuit being located adjacent said first end of said second series circuit; and (b) a source of electrical power having at least first and second terminals and a voltage differential between said terminals, wherein said second end of said first series circuit and said first end of said second series circuit are both connected to said first terminal of said power source thereby to minimize current leakage between said second end of said first series circuit and said first end of said second series circuit.

13. The ceramic fiber heater of claim 12, wherein said electrical power source is a single phase power source having only said first and second terminals, wherein said first end of said first series circuit and said second end of said second series are connected to said second terminal, and wherein said second end of said first series circuit and said first end of said second series circuit are connected to said first terminal.

14. The ceramic fiber heater of claim 12, wherein said electrical power source is a three phase power source, said ceramic heater further comprising a third heater block located beside said second heater block, said third heater block comprising a third series circuit comprising a plurality of heater elements arranged side by side on said base and connected together in series such that said heater elements are carried substantially along said length of said third series circuit by said base, said third series circuit having first and second ends spaced apart from one another, said first end of said third series circuit being located between said second end of said second series circuit and said second end of said third series circuit, said second end of said second series circuit being located adjacent said first end of said third series circuit; and wherein said three phase power source additionally comprises a third terminal, said second end of said first series circuit and said first end of said second series circuit being connected to said first terminal, said first end of said first series circuit and said second end of said third series circuit being connected to said second terminal, and said second end of said second series circuit and said first end of said third series circuit being connected to said third terminal.

15. The ceramic fiber heater of claim 12, wherein said insulation material is mullite.

16. The ceramic fiber heater of claim 12, further comprising a current control element between one of said ends of said heater blocks and one of said power source terminals.

17. The ceramic fiber heater of claim 16 wherein said current control element is one of the following: a relay, a solid state relay, a semiconductor relay, and a thyristor.

18. The ceramic fiber heater of claim 12, wherein said heater element is of serpentine construction.

19. The ceramic fiber heater of claim 18 wherein said heater element is constructed of nichrome or an iron-nichrome-aluminum alloy.

20. The ceramic fiber heater of claim 19 wherein at least a 100 volt electrical potential is applied to heat said heater elements to a temperature of at least 900° Centigrade.

* * * * *